United States Patent
Kobayashi et al.

(10) Patent No.: US 10,309,464 B2
(45) Date of Patent: Jun. 4, 2019

(54) FIXED CONSTANT VELOCITY UNIVERSAL JOINT

(71) Applicant: NTN CORPORATION, Osaka (JP)

(72) Inventors: Tomoshige Kobayashi, Shizuoka (JP); Mika Kohara, Shizuoka (JP); Teruaki Fujio, Shizuoka (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 15/124,934

(22) PCT Filed: Mar. 12, 2015

(86) PCT No.: PCT/JP2015/057243
§ 371 (c)(1),
(2) Date: Sep. 9, 2016

(87) PCT Pub. No.: WO2015/141548
PCT Pub. Date: Sep. 24, 2015

(65) Prior Publication Data
US 2017/0023069 A1 Jan. 26, 2017

(30) Foreign Application Priority Data
Mar. 17, 2014 (JP) ................................. 2014-053727

(51) Int. Cl.
*F16D 3/223* (2011.01)
*F16D 3/2245* (2011.01)

(52) U.S. Cl.
CPC .. *F16D 3/2245* (2013.01); *F16D 2003/22303* (2013.01); *F16D 2300/06* (2013.01); *Y10S 464/906* (2013.01)

(58) Field of Classification Search
CPC ............... F16D 3/2245; F16D 2300/06; F16D 2003/22303; Y10S 464/906
USPC .................................................. 464/15, 145
See application file for complete search history.

(56) References Cited

U.S. PATENT DOCUMENTS 6,120,382 A   9/2000  Sone et al.
6,267,682 B1  7/2001  Sone et al.
(Continued)

FOREIGN PATENT DOCUMENTS

CN   102575719   7/2012
EP   1 031 748   8/2000
(Continued)

OTHER PUBLICATIONS

Universal Joint and Driveshaft Design Manual, AE-7, Society of Automotive Engineers, Inc., Warrendale, PA, pp. 145-150, TJ1079.S62 1979.*
(Continued)

*Primary Examiner* — Greg Binda
(74) *Attorney, Agent, or Firm* — Wenderoth, Lind & Ponack, L.L.P.

(57) ABSTRACT

A fixed type constant velocity universal joint includes an outer joint member having eight curved track grooves, an inner joint member having eight curved track grooves, eight torque transmission balls, and a cage configured to hold the torque transmission balls in pockets. A curvature center of each of the track grooves of the outer joint member and a curvature center of each of the track grooves of the inner joint member are offset from a joint center by an equal distance to opposite sides in the axial direction. The joint has grease sealed therein. Initial pocket gaps between the pockets and the balls each have a positive value. The grease has an initial consistency equivalent to consistency number 1 or 2, and a mixture stability of from 390 to 440.

5 Claims, 5 Drawing Sheets

(56) References Cited

U.S. PATENT DOCUMENTS

| | | | |
|---|---|---|---|
| 6,332,844 B1 | 12/2001 | Hayama et al. | |
| 6,506,122 B2 * | 1/2003 | Nakagawa | F16D 3/2237 464/145 |
| 8,118,682 B2 * | 2/2012 | Kohana | C10M 111/04 464/15 |
| 8,162,766 B2 * | 4/2012 | Kura | F16D 3/2237 464/145 |
| 2002/0032064 A1 | 3/2002 | Sone et al. | |
| 2005/0152628 A1 | 7/2005 | Egami et al. | |
| 2012/0184382 A1 | 7/2012 | Kobayashi et al. | |
| 2016/0305488 A1 * | 10/2016 | Yoshihara | F16D 3/2245 |

FOREIGN PATENT DOCUMENTS

| | | |
|---|---|---|
| JP | 2002-13544 | 1/2002 |
| JP | 2006-29346 | 2/2006 |
| JP | 2006-199761 | 8/2006 |
| JP | 2006-258207 | 9/2006 |
| JP | 2006-321449 | 11/2006 |
| JP | 3859264 | 12/2006 |
| JP | 2013-32813 | 2/2013 |

OTHER PUBLICATIONS

Japanese Industrial Standard K 2220 as filed by applicant Nov. 26, 2018. (Year: 2013).*

Extended European Search Report dated Oct. 30, 2017 in corresponding European Application No. 15766020.0.

International Search Report dated Jun. 16, 2015 in International (PCT) Application No. PCT/JP2015/057243.

Chinese Office Action dated May 3, 2018 in corresponding Chinese Patent Application No. 201580014221.7 with English Translation of Search Report.

* cited by examiner

FIXED CONSTANT VELOCITY UNIVERSAL JOINT

TECHNICAL FIELD

The present invention relates to a fixed type constant velocity universal joint, which is to be used on a driving wheel side of a drive shaft of an automobile and configured to allow only angular displacement.

BACKGROUND ART

With reference to FIG. 1, a Rzeppa constant velocity universal joint serving as a fixed type constant velocity universal joint mainly includes an outer joint member 2, an inner joint member 3, balls 4, and a cage 5. In a spherical radially inner surface 8 of the outer joint member 2, a plurality of curved track grooves 6 are formed equiangularly along an axial direction. In a spherical radially outer surface 9 of the inner joint member 3, a plurality of curved track grooves 7 opposed to the track grooves 6 of the outer joint member 2 are formed equiangularly along the axial direction. A plurality of balls 4 configured to transmit torque are arranged between the track grooves 6 of the outer joint member 2 and the track grooves 7 of the inner joint member 3, respectively. The cage 5 configured to hold the balls 4 is arranged between the spherical radially inner surface 8 of the outer joint member 2 and the spherical radially outer surface 9 of the inner joint member 3. An outer periphery of the outer joint member 2 and an outer periphery of a shaft 12 coupled to the inner joint member 3 are covered with a boot 13, and grease serving as a lubricant is sealed inside the joint.

Curvature centers of the spherical radially inner surface 8 of the outer joint member 2 and the spherical radially outer surface 9 of the inner joint member 3 are each formed at a joint center O. In contrast, a curvature center A of each of the track grooves 6 of the outer joint member 2 and a curvature center B of each of the track grooves 7 of the inner joint member 3 are offset from the joint center O by an equal distance f1 to opposite sides in the axial direction. With this, when the joint forms an operating angle, the balls 4 are always guided on a plane bisecting an angle formed by axis lines of the outer joint member 2 and the inner joint member 3, and hence rotation torque is transmitted between the two axes at constant velocity.

A fixed type constant velocity universal joint 1 is an eight-ball Rzeppa constant velocity universal joint, and, as compared to related-art six-ball constant velocity universal joints, has a smaller track offset amount, a larger number of balls, and a smaller diameter, to thereby achieve a constant velocity universal joint, which secures strength, load capacity, and durability equal to or higher than those of fixed type universal joints using six balls and is lightweight, compact, and highly efficient with reduced torque loss. In order to reduce heat generation due to a large normal operating angle or during high speed rotation in such an eight-ball fixed type constant velocity universal joint, there has been proposed a fixed type constant velocity universal joint with focus on a pocket gap of a cage and on a spherical surface gap between an inner joint member and the cage (Patent Document 1).

PRIOR ART DOCUMENTS

Patent Documents

Patent Document 1: JP 2006-258207 A

SUMMARY OF THE INVENTION

Problems to be Solved by the Invention

In recent years, in the aim of improving fuel consumption of automobiles, there has been an increasing demand for reduced weight and higher efficiency in a constant velocity universal joint being an automobile component. In particular, with development of public roads and highway networks, improved transmission efficiency and durability at a low operating angle has been strongly demanded for a fixed type constant velocity universal joint to be used in a drive shaft of a vehicle having a vehicle height which is not high, including a sedan vehicle (hereinafter representatively referred to as a sedan vehicle).

The fixed type constant velocity universal joint described in Patent Literature 1 has been achieved by improving an internal specification of a fixed type constant velocity joint with focus on reduction of heat generation due to a large normal operating angle of a drive shaft or during high speed rotation of a propeller shaft under use of an eight-ball fixed type constant velocity universal joint. However, the fixed type constant velocity universal joint described in Patent Literature 1 has been achieved without focus on improvement in transmission efficiency and durability of a fixed type constant velocity universal joint to be used in a drive shaft having a relatively small normal operating angle of the above-mentioned sedan vehicle.

The present invention has been proposed in view of the above-mentioned problem, and an object of the present invention is to reduce transmission torque loss and improve durability of a fixed type constant velocity universal joint to be used in a drive shaft having a small normal operating angle without changing a basic shape configuration of an eight-ball fixed type constant velocity universal joint which secures strength, load capacity, and durability equal to or higher than those of related-art joints (six-ball fixed type constant velocity universal joints) and is lightweight, compact, and highly efficient with reduced torque loss.

Solutions to the Problems

The inventors of the present invention have conducted extensive studies and verifications to achieve the above-mentioned object and arrived at the present invention based on the following multifaceted knowledge and estimation activities.

(1) Dynamic Analysis on Energy Loss

First, verification was conducted through a dynamic analysis taking into account a friction to determine a contact site involving occurrence of energy loss during torque transmission of an eight-ball fixed type constant velocity universal joint. As a result of this analysis, as shown in FIG. 7, it was found that the energy loss was the largest at a contact portion between a pocket of a cage and a ball at a small operating angle, the next largest at a contact portion between a track groove of an outer joint member and the ball or at contact portions between inner and outer joint members and spherical surfaces of the cage, and followed by a contact portion between the track groove of the inner joint member and the ball. Based on this analysis result, a priority was given on investigation regarding the contact portion between the pocket of the cage and the ball. Herein, the energy loss represents the amount of work at each contact site by an internal force of the constant velocity universal joint in the above-mentioned dynamic analysis. According to the analysis result, the energy loss was in a proportional relationship with torque loss as measured transmission efficiency of the constant velocity universal joint.

(2) State of Contact in Joint

As a state of the contact between the pocket of the cage and the ball in the previous section, the ball is typically incorporated in the pocket of the cage with an interference, and hence smooth motion between the ball and the pocket of the cage and between the ball and the track grooves of the inner and outer joint members is restricted. Based on the result of the dynamic analysis in the previous section, attention was placed on the possibility that forming a positive gap between the pocket of the cage and the ball can reduce torque loss which may occur between the cage and the ball and most significantly affect the torque loss during the small operating angle, and can also reduce torque loss between the ball and the track grooves of the inner and outer joint members.

(3) Comfortability of Sedan Vehicle

Meanwhile, what is to be taken into account is that comfortability is considered with importance for a sedan vehicle including a drive shaft having a small normal operating angle, and hence there is a particularly strict demand for NVH (Noise, Vibration, and Harshness, the same applies in the following) properties. Specifically, excessively large play (positive gap) between the pocket of the cage and the ball may cause undesired influence on joint properties, such as occurrence of hitting sound (abnormal noise) between the pocket and the ball and increased joint vibration. This influence is an important problem particularly for a drive shaft of the sedan vehicle for which comfortability is considered with importance. Such circumstances have led to the conclusion that it is necessary to cope with the difficult problem of whether or not the positive gap between the pocket of the cage and the ball satisfies the conditions of actual vehicles, and in that the demands on the sedan vehicles cannot be met only with the internal specification of forming the positive gap between the pocket and the ball.

(4) New Focus

In view of the above, while securing the NVH properties of the sedan vehicles is considered as an essential condition, focus has been placed on further improvement in the effect of reducing torque loss through reduction of a friction between the pocket of the cage and the ball, in addition to the attempt to reduce torque loss from the viewpoint of the internal specification of the joint through formation of the positive gap between the pocket of the cage and the ball.

(5) Flowability of Grease

Regarding properties of grease which may be considered as a measure for reducing the friction described in the previous section, grease having higher flowability as compared to grease having low flowability can easily enter a sliding portion inside the constant velocity universal joint. In particular, it has been found that, as compared to a contact site having a rolling component between the track grooves and the ball, the flowability has more significant influence between the pocket of the cage and the ball being a sliding portion which does not include the rolling component. However, a difficult problem has arisen also on the flowability of grease. Specifically, there is a problem in that although consistency serves as a parameter for the flowability of grease, the consistency cannot be simply selected in a practical sense, and hence it is necessary to consider in multiple viewpoints, such as handling ability at the time of assembling the joint, prevention of leakage from a boot, and flowability in the joint (ability to supply grease to the sliding site).

(6) New Idea Regarding Properties of Grease

As a result of various consideration based on the studies and verifications described above, the inventors have arrived at a new idea of using grease which has, regarding the properties of grease, a generally employed level of initial consistency but has a larger consistency during operation, to thereby satisfy both "handling ability at the time of assembly" and "ability to supply grease to the sliding portion".

As a technical measure to achieve the above-mentioned object, according to one embodiment of the present invention, there is provided a fixed type constant velocity universal joint, comprising: an outer joint member having eight curved track grooves formed in a spherical radially inner surface so as to extend in an axial direction; an inner joint member having eight curved track grooves formed in a spherical radially outer surface so as to extend in the axial direction; eight torque transmission balls arranged between the eight curved track grooves of the outer joint member and the eight curved track grooves of the inner joint member corresponding thereto; and a cage configured to hold the eight torque transmission balls in pockets, the cage having a spherical radially outer surface and a spherical radially inner surface to be fitted to the spherical radially inner surface of the outer joint member and the spherical radially outer surface of the inner joint member, respectively, wherein a curvature center of each of the eight curved track grooves of the outer joint member and a curvature center of each of the eight curved track grooves of the inner joint member are offset from a joint center by an equal distance to opposite sides in the axial direction, wherein the joint has grease sealed therein, wherein initial pocket gaps between the pockets and the eight torque transmission balls each have a positive value, and wherein the grease has an initial consistency equivalent to consistency number 1 or 2 (mixture consistency of 265 to 340), and a mixture stability of from 390 to 440.

In this specification and the scope of claims, the initial consistency of the grease being equivalent to consistency number 1 or 2 (mixture consistency of from 265 to 340) means that the initial consistency of the grease is equivalent to consistency number 1 or 2 defined by JIS K 2220. According to JIS K 2220, the consistency of grease is determined by releasing a cone of magnesium or other suitable metal with a detachable hardened steel tip that has a total mass of 102.5 g±0.05 g from a penetrometer into a properly prepared sample of the grease (e.g., the grease is at a temperature of 25° C.), letting the cone drop for 5 seconds, and then measuring the penetration of the cone in the sample of the grease in units of tenths of a millimeter. If the penetration (i.e., worked penetration range) of the cone in the sample of the grease is from 265 to 295 units, the grease is deemed to have a cone penetration number (i.e., consistency number) of 2. If the penetration (i.e., worked penetration range) of the cone in the sample of the grease is from 310 to 340, the grease is deemed to have a cone penetration number (i.e., consistence number) of 1.

Also, the mixture stability of from 390 to 440 means that the mixture stability ($10^5$ W) defined by JIS K 2220 is from 390 to 440, which is the number of units of penetration of cone into the grease during a test as detailed above, when the grease is in use. That is, the mixture stability ($10^5$ W) defined by JIS K 2220 is the consistency obtained after mixing grease in a prescribed mixing device for a hundred thousand times, retaining the grease at 25° C., and further mixing the grease for sixty times, W meaning the number of strokes performed by the grease worker used as the mixing device. Thus, the mixture stability can be used as a parameter for the consistency during operation of the joint. When the initial consistency is equivalent to consistency number 1 or 2 (mixture consistency of from 265 to 340), the operability at the time of assembling the joint is not impaired. Further, when the mixture stability is from 390 to 440, the consistency increases (flowability increases) during operation, and grease is supplied to a gap portion, thereby being capable of reducing torque loss. The mixture stability larger than 440 is not preferred because grease becomes more liable to leak out from the boot.

The configuration described above can reduce transmission torque loss and improve durability of the fixed type constant velocity universal joint to be used in the drive shaft having a small normal operating angle, without changing the basic shape configuration of the eight-ball fixed type constant velocity universal joint which secures strength, load capacity, and durability equal to or higher than those of the related-art joints (six-ball fixed type constant velocity universal joints) and is lightweight, compact, and highly efficient with reduced torque loss.

In an effective configuration of the eight-ball fixed type constant velocity universal joint, it is preferred that a ratio $r1(=PCD_{BALL}/D_{BALL})$ of a pitch circle diameter ($PCD_{BALL}$) and a ball diameter ($D_{BALL}$) of each of the above-mentioned eight torque transmission balls be within a range of $3.3 \leq r1 \leq 5.0$, and that a ratio $r2(=D_{OUTER}/PCD_{SERR})$ between an outer diameter ($D_{OUTER}$) of the outer joint member and a pitch circle diameter ($PCD_{SERR}$) of serrations of a fitting portion in the inner joint member be within a range of $2.5 \leq r2 < 3.5$. With this, the strength, the load capacity, and the durability equal to or higher than those of the related-art joints (six-ball fixed type constant velocity universal joints) are given, and the outer diameter size is compactified.

It is preferred that the above-mentioned initial pocket gap be from 0 µm to 20 µm. With this, in combination with the characteristics of sealed grease, torque loss is reduced in the fixed type constant velocity universal joint to be used in the drive shaft having a small normal operating angle, and hitting sound or joint vibration between the pocket and the ball during a large operating angle can be prevented.

It is preferred that the above-mentioned grease contain a paraffin-based mineral oil at 70 mass % or more with respect to a total mass of a lubricating oil component contained as a base oil. With this, the paraffin-based mineral oil is advantageous in view of costs, and exhibits drastically improved flowability when the paraffin-based mineral oil receives shear caused by motion inside the joint, thereby being capable of reducing the torque loss.

A thickener for the above-mentioned grease comprises urea compounds, thereby being capable of achieving superior heat-resistant characteristics and entry characteristics and suppressing abrasion of the pocket of the cage.

Advantageous Effects of Invention

According to the present invention, it is possible to reduce the transmission torque loss and improve the durability of the fixed type constant velocity universal joint to be used in the drive shaft having a small normal operating angle without changing the basic shape configuration of the eight-ball fixed type constant velocity universal joint which secures the strength, the load capacity, and the durability equal to or higher than those of the related-art joints (six-ball fixed type constant velocity universal joints) and is lightweight, compact, and highly efficient with the reduced torque loss.

DESCRIPTION OF EMBODIMENTS

Figure 1:
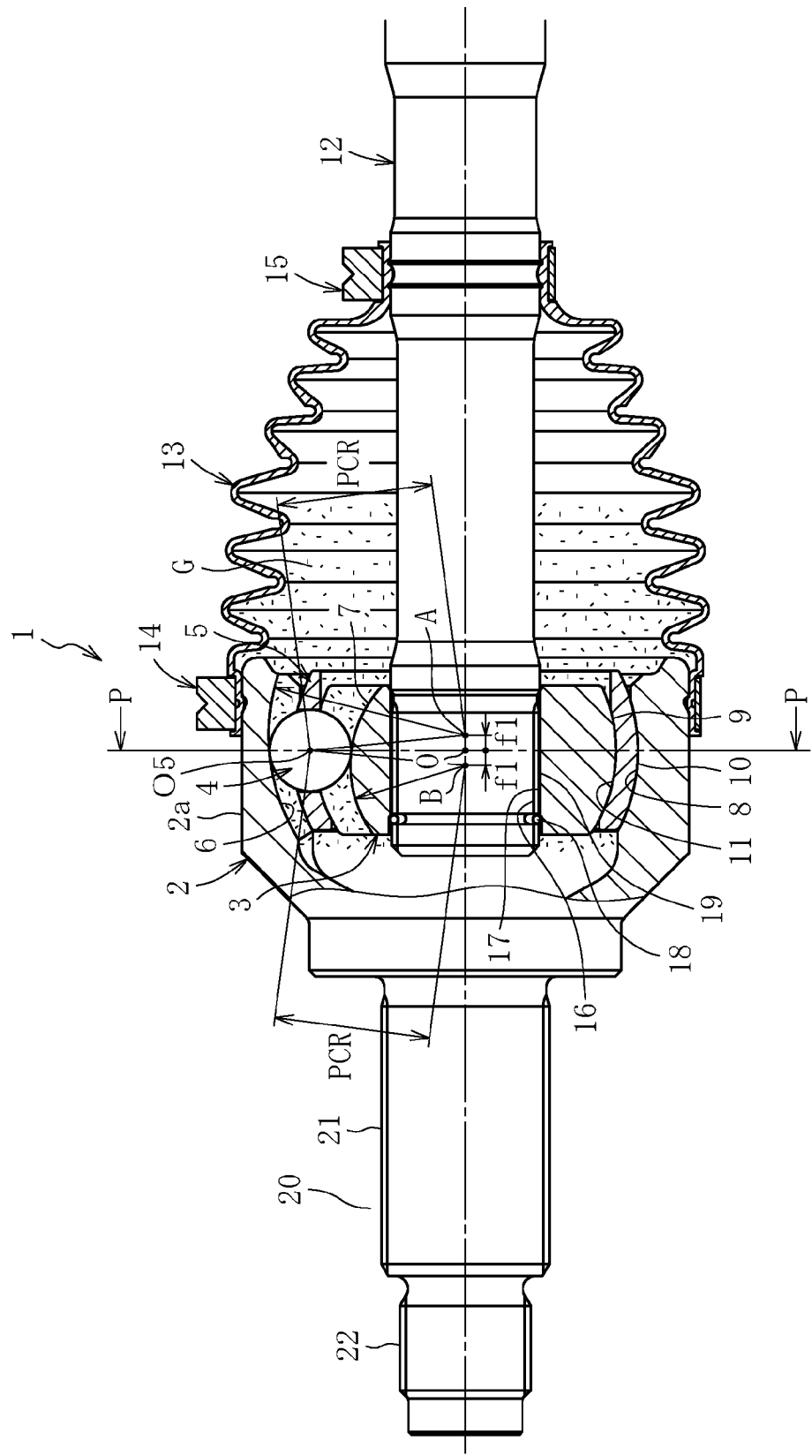
FIG. 1 is a longitudinal sectional view of a fixed type constant velocity universal joint according to one embodiment of the present invention.
Figure 2:
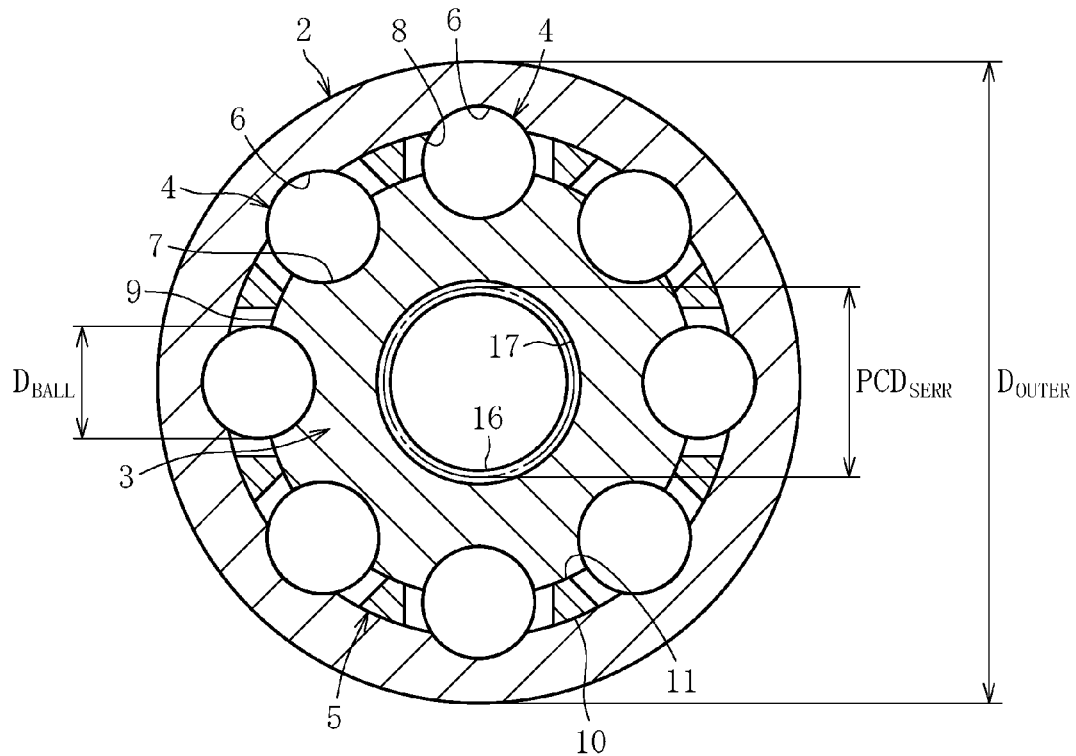
FIG. 2 is a transverse sectional view of the fixed type constant velocity universal joint of FIG. 1.
Figure 3:
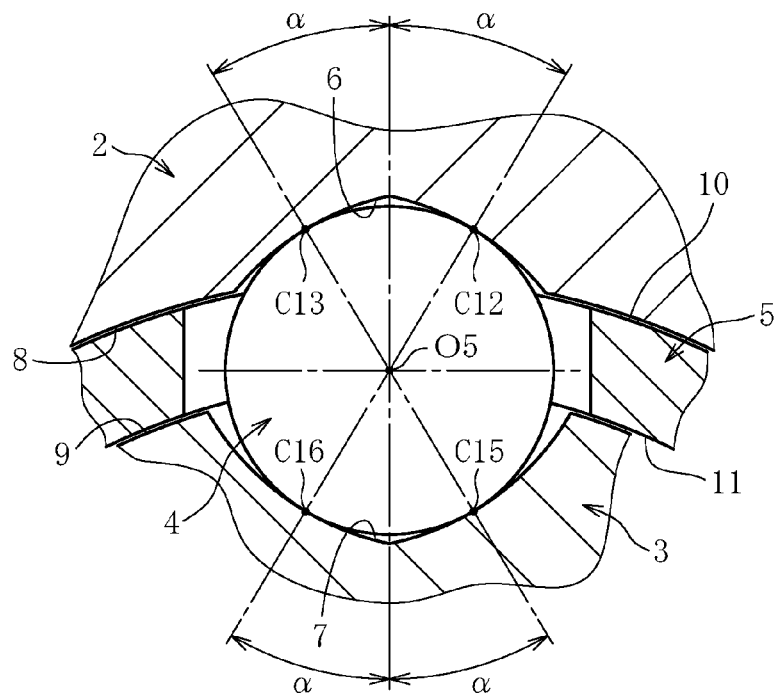
FIG. 3 is an enlarged transverse sectional view of a ball and track grooves of FIG. 2.
Figure 4:
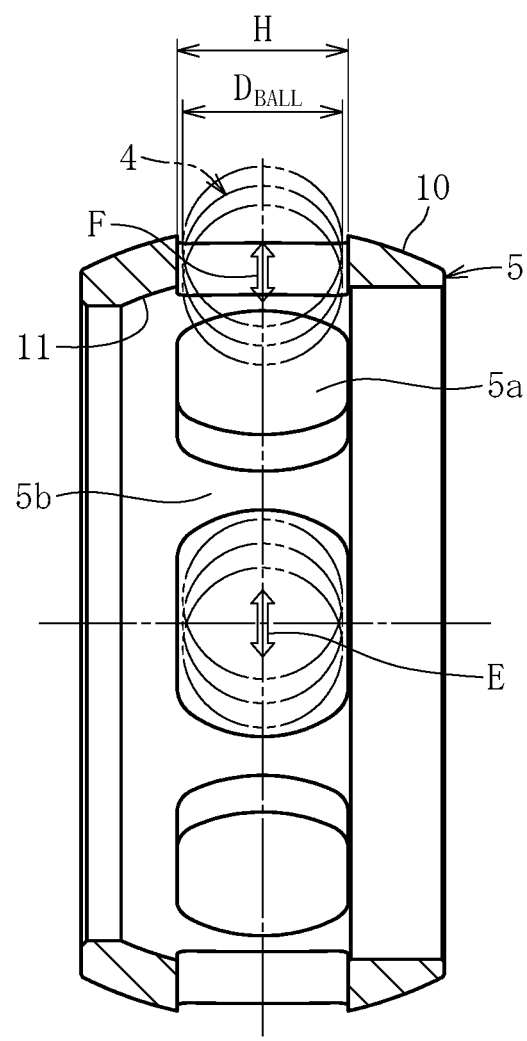
FIG. 4 is a longitudinal sectional view of a cage of the fixed type constant velocity universal joint of FIG. 1.
Figure 5:
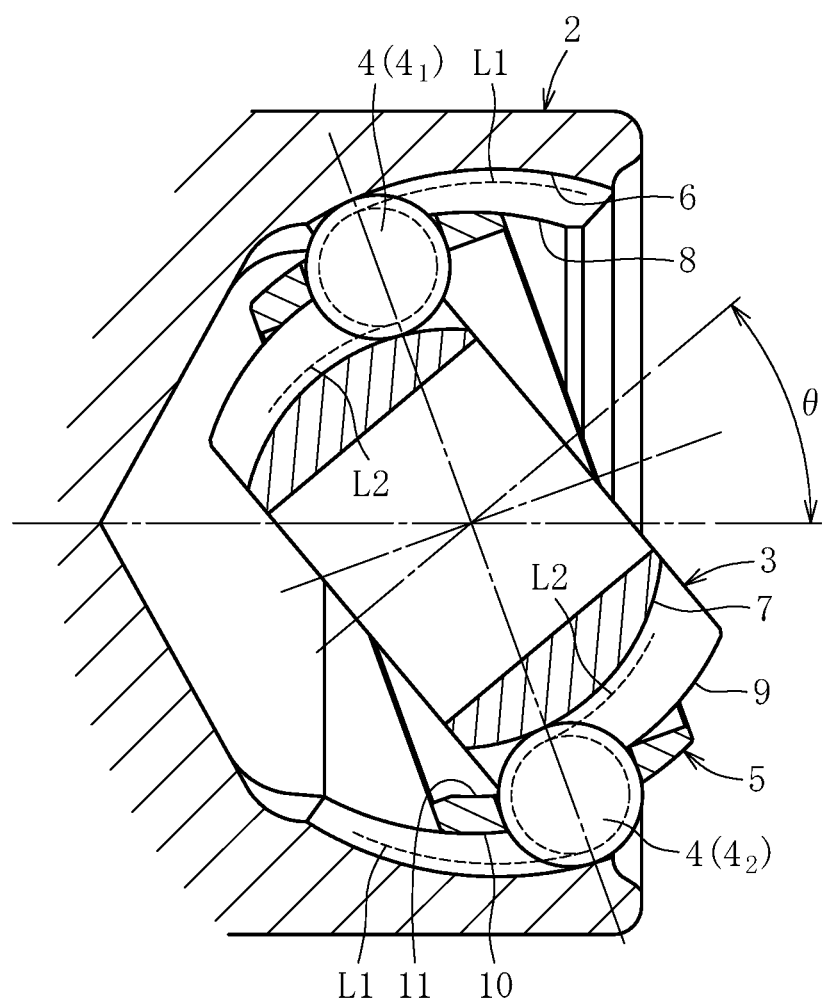
FIG. 5 is a longitudinal sectional view for illustrating a state in which the fixed type constant velocity universal joint of FIG. 1 forms a large operating angle.

Now, one embodiment of the present invention is described with reference to FIG. 1 to FIG. 5. FIG. 1 is a partial longitudinal sectional view of a fixed type constant velocity universal joint of this embodiment. FIG. 2 is a transverse sectional view taken along the line P-P of FIG. 1 and viewed from the direction of the arrows. FIG. 3 is an enlarged transverse sectional view of a ball and track grooves. FIG. 4 is a longitudinal sectional view of a cage. FIG. 5 is a longitudinal sectional view for illustrating a state in which the fixed type constant velocity universal joint forms a large operating angle.

A fixed type constant velocity universal joint 1 of this embodiment is a Rzeppa constant velocity universal joint, and mainly comprises, as illustrated in FIG. 1 and FIG. 2, an outer joint member 2, an inner joint member 3, balls 4, and a cage 5. In a spherical radially inner surface 8 of the outer joint member 2, eight curved track grooves 6 are formed equiangularly along an axial direction. In a spherical radially outer surface 9 of the inner joint member 3, eight curved track grooves 7 opposed to the track grooves 6 of the outer joint member 2 are formed equiangularly along the axial direction. Eight balls 4 configured to transmit torque are incorporated between the track grooves 6 of the outer joint member 2 and the track grooves 7 of the inner joint member 3, respectively. The cage 5 configured to hold the balls 4 is arranged between the spherical radially inner surface 8 of the outer joint member 2 and the spherical radially outer surface 9 of the inner joint member 3. A spherical radially outer surface 10 of the cage 5 is fitted to the spherical radially inner surface 8 of the outer joint member 2, and a spherical radially inner surface 11 of the cage 5 is fitted to the spherical radially outer surface 9 of the inner joint member 3.

Curvature centers of the spherical radially inner surface 8 of the outer joint member 2 and the spherical radially outer surface 9 of the inner joint member 3 are each formed at a joint center O. In contrast, a curvature center A of the curved track grooves 6 of the outer joint member 2 and a curvature center B of the curved track grooves 7 of the inner joint member 3 are offset from the joint center O by an equal distance f1 to opposite sides in the axial direction. With this, when the joint forms an operating angle, the balls 4 are always guided on a plane bisecting an angle formed by axis lines of the outer joint member 2 and the inner joint member 3, and hence rotation is transmitted between the two axes at constant velocity.

Female splines (splines include serrations, and the same applies hereinafter) 16 are formed in a radially inner hole 17 of the inner joint member 3, and male splines 19 formed on an end portion of an intermediate shaft 12 are fitted to the female splines 16 so as to be coupled in a torque-transmittable manner. The inner joint member 3 and the intermediate shaft 12 are positioned in the axial direction by a stopper ring 18.

A boot 13 is mounted on an outer periphery of the outer joint member 2 and an outer periphery of the shaft 12 coupled to the inner joint member 3, and both ends of the boot 13 are fastened and fixed by boot bands 14 and 15. Grease G serving as a lubricant is sealed inside the joint covered with the boot 13.

At a bottom of a mouth portion 2a of the outer joint member 2, a stem portion 20 is integrally formed. The stem portion 20 has male splines 21 and a screw portion 22, which are to be fitted to a hub wheel (not shown) on which a driving wheel is to be mounted.

FIG. 3 is an enlarged transverse sectional view of the ball and the track grooves of FIG. 2. As illustrated in FIG. 3, the ball 4 is in angular contact with the track groove 6 of the outer joint member 2 at two points C12 and C13, and is in angular contact with the track groove 7 of the inner joint member 3 at two points C15 and C16. It is preferred that an angle (contact angle α) formed by straight lines passing through a ball center O5 and each of contact points C12, C13, C15, and C16 and a straight line passing through the ball center O5 and the joint center O be set to be 30° or larger.

With reference to FIG. 1 and FIG. 2, in the eight-ball fixed type constant velocity universal joint 1 according to this embodiment, a ratio r1 ($=PCD_{BALL}/D_{BALL}$) between a pitch circle diameter ($PCD_{BALL}$) and a ball diameter ($D_{BALL}$) of the balls 4 is set to be within the range of $3.3 \leq r1 \leq 5.0$, preferably $3.5 \leq r1 \leq 5.0$. Herein, the pitch circle diameter ($PCD_{BALL}$) of the balls 4 has a size which is twice as large as PCR ($PCD_{BALL}=2 \times PCR$). A length of a line segment connecting the curvature center A of the track grooves 6 of the outer joint member 2 and the center O5 of the ball 4 and a length of a line segment connecting the curvature center B of the track grooves 7 of the inner joint member 3 and the center O5 of the ball 4 each correspond to PCR, and both PCR are equal to each other. Further, a ratio r2 ($=D_{OUTER}/PCD_{SERR}$) between an outer diameter ($D_{OUTER}$) of the outer joint member 2 and a pitch circle diameter ($PCD_{SERR}$) of the female splines 16 formed in the radially inner hole 17 of the inner joint member 2 is set to a value within the range of $2.5 \leq r2 \leq 3.5$. Thus, strength, load capacity, and durability equal to or higher than those of related-art joints (six-ball fixed type constant velocity universal joints) are given, and the outer diameter size is compactified.

Regarding an internal specification of a joint constructing features of the fixed type constant velocity universal joint 1 according to this embodiment, a pocket gap between a pocket of the cage and the ball is described with reference to FIG. 4. FIG. 4 is a longitudinal sectional view of the cage. The cage 5 has eight pockets 5a in the circumferential direction. Surfaces of the pocket 5a opposed to each other in the axial direction are surfaces configured to hold the ball 4, and an axial size between those surfaces is denoted by H. Further, an initial pocket gap δ with the diameter ($D_{BALL}$) of the ball 4, which is indicated by the two-dot chain line, is represented by the following expression.

Initial pocket gap δ=Axial size $H$ of pocket of cage−Diameter of ball ($D_{BALL}$)

In the fixed type constant velocity universal joint 1 according to this embodiment, the initial pocket gap δ is set to be a value, preferably from 0 μm to 20 μm. This range of the initial pocket gap δ was verified through experiments taking into account the conditions of actual vehicles. In combination with the characteristics of sealed grease described later, torque loss is reduced in the fixed type constant velocity universal joint to be used at a small normal operating angle for a drive shaft of a sedan vehicle for which comfortability is considered with importance, and hitting sound or joint vibration between the pocket and the ball during a large operating angle can be suppressed.

Motion of the ball 4 in the pocket 5a of the cage 5 related to the action and the effect described above is supplementary described. When the joint forms an operating angle, the ball 4 slides in the pocket 5a of the cage 5 in the radial direction and the circumferential direction of the cage 5. As illustrated in FIG. 4, sliding in the circumferential direction (the arrow E of FIG. 4) corresponds to sliding of the ball 4 from the center of the pocket 5a in the circumferential direction so as to approach to a pillar portion 5b. This sliding in the circumferential direction occurs as follows. When the operating angle is formed, the outer joint member 2 and the inner joint member 3 intersect obliquely. Thus, the circumferential intervals of the circumferentially adjacent contact points C12 and C13 and of the contact points C15 and C16 between the track grooves 6 and 7 and the ball 4 are changed. With this, the ball 4 restrained by the track grooves 6 and 7 is moved in the circumferential direction with respect to the pocket 5a, thereby causing the sliding.

Meanwhile, sliding of the ball 4 in the radial direction (the arrow F of FIG. 4) in the pocket 5a is caused by a track offset amount f1 (refer to FIG. 1). The reason is described below. As illustrated in FIG. 5, when the operating angle θ is formed, a ball $4_1$ at a top dead point moves to a deep side of the outer joint member 2, and a ball $4_2$ at a bottom dead point moves to an opening side of the outer joint member 2. The track offset amount f1 is provided, and hence the track grooves 6 and 7 of the outer joint member 2 and the inner joint member 3 are formed so that a groove depth is deeper on the opening side and becomes shallower as approaching toward the deep side. Therefore, the ball $4_1$ having moved to the deep side of the outer joint member 2 moves to a radially inner side, and the ball $4_2$ having moved to the opening side of the outer joint member 2 moves to a radially outer side. As described above, the ball 4 moves in the radial direction in accordance with the axial positions on the track grooves 6 and 7 in abutment against the ball 4. L1 illustrated in FIG. 5 represents trajectories of the contact points C12 and C13 (see FIG. 3) between the track groove 6 of the outer joint member 2 and the ball 4, and L2 represents trajectories of the contact points C15 and C16 (see FIG. 3) between the track groove 7 of the inner joint member 3 and the ball 4.

The above-mentioned sliding of the ball 4 in the pocket 5a (see FIG. 4) in the radial direction and the circumferential direction neither includes a rolling component. The sliding portion which does not include the rolling component is less likely to allow entry of grease as compared to a contact site having a rolling component between the track groove and the ball, and hence the flowability has significant influence. This analysis result was linked with the verification result, which was derived as a result of the above-mentioned dynamic analysis, that the energy loss at the contact portion between the cage and the ball is the largest at the small operating angle, and it served as a key for estimating the properties of grease described later.

Now, the normal operating angle of the fixed type constant velocity universal joint is described. In the case of a drive shaft of an automobile, and for an automobile running on a horizontal and flat road surface and having two passengers, the normal operating angle refers to an operating angle which is formed in a fixed type constant velocity universal joint for a front drive shaft when the steering wheel is brought into a straight state. The normal operating angle is typically determined in the range of from about 2° to about 15° in accordance with design conditions for each kind of vehicle. Automobiles are mainly classified into a sedan vehicle and an SUV (Sport Utility Vehicle). The sedan vehicle typically has a normal operating angle of from about 3° to about 6°. An SUV is a vehicle having a high vehicle height including a van and a pick-up truck, and the normal operating angle is typically from about 6° to about 12°. A normal operating angle of 8° or larger is referred to as a large normal operating angle, and a normal operating angle of from about 3° to about 6° is referred to as a small normal operating angle.

Meanwhile, what is to be taken into account is that there is a particularly strict demand for the NVH characteristics on the sedan vehicle including a drive shaft having a small normal operating angle. Excessively large play (positive gap) between the pocket of the cage and the ball may cause undesired influence on joint properties, such as occurrence of hitting sound between the pocket and the ball and increased joint vibration. This influence is an important problem particularly for the drive shaft of the sedan vehicle for which comfortability is considered with importance. Such circumstances have led to the conclusion in that it is necessary to cope with the difficult problem of whether or not the positive gap between the pocket of the cage and the ball satisfies the conditions of actual vehicles, and in that the demands on the sedan vehicles cannot be met only with the internal specification of forming the positive gap between the pocket and the ball.

In view of the above, while securing the NVH properties of the sedan vehicles is considered as an essential condition, focus has been placed on further improvement in the effect of reducing torque loss through reduction of a friction between the pocket of the cage and the ball, in addition to the attempt to reduce torque loss from the viewpoint of the internal specification of the joint through formation of the positive gap between the pocket of the cage and the balls.

Regarding properties of grease which may be considered as a measure for reducing the friction, as described above, grease having higher flowability as compared to grease having low flowability can easily enter the sliding portion inside the constant velocity universal joint. In particular, as compared to a contact site having a rolling component between the track grooves and the ball, the flowability has more significant influence between the pocket of the cage and the ball being a sliding portion which does not include the rolling component.

However, a difficult problem has arisen also on the flowability of grease. Specifically, there is a problem in that although consistency serves as a parameter for the flowability of grease, the consistency cannot be simply selected in a practical sense, and hence it is necessary to consider in multiple viewpoints, such as handling ability at the time of assembling a joint, prevention of leakage from a boot, and flowability in the joint (ability to supply grease to a sliding site).

As a result of various consideration based on the studies and verifications described above, the inventors have arrived at a new idea of using grease which has, from the viewpoint of the properties of grease, a generally employed level of initial consistency but has a larger consistency during operation, to thereby satisfy both "handling ability at the time of assembly" and "ability to supply grease to the sliding portion", and achieved this embodiment.

Regarding a lubricant constructing the features of the fixed type constant velocity universal joint 1 according to this embodiment, grease to be sealed inside the joint is described. The grease G has an initial consistency equivalent to consistency number 1 or 2 (mixture consistency of from 265 to 340), and a mixture stability of from 390 to 440. The initial consistency is equivalent to consistency number 1 or 2 (mixture consistency of from 265 to 340), and hence operability at the time of assembling a joint is not impaired. Further, the mixture stability is from 390 to 440. Thus, the consistency increases during operation, and grease is supplied to a gap portion, thereby being capable of reducing torque loss. As described above, employing the grease G having the above-mentioned properties can achieve both the "handling ability at the time of assembly" and "ability to supply grease to the sliding portion". With this, reduction of torque loss and improvement in durability demanded on a fixed type constant velocity universal joint used at a low normal operating angle for a drive shaft of the sedan vehicle can be achieved.

As actual running states of an automobile, on a steeply curved road or at an intersection, an operating angle which is formed in the fixed type constant velocity universal joint becomes larger than the above-mentioned normal operating angle. However, frequency of use at a large operating angle on a steeply curved road or at an intersection is small, and hence in the fixed type constant velocity universal joint 1 according to this embodiment, an attempt to improve the joint efficiency (reduction of torque loss) is made within the range of the normal operating angle, thereby being capable of totally improving the joint efficiency.

The grease G has a composition including a base oil, a thickener, and an additive. It is preferred that a paraffin-based mineral oil be contained as the base oil at 70 mass % or more with respect to the total mass of the lubricating oil component contained as the base oil. The paraffin-based mineral oil is blended as the main component from the viewpoint of cost. The paraffin-based mineral oil exhibits drastically improved flowability when the oil receives shear by motion inside the joint, thereby being capable of reducing the torque loss.

The thickener is preferably a urea compound. Examples of the urea compound include a diurea compound and a polyurea compound. The diurea compound is obtained by, for example, a reaction between a diisocyanate and a monoamine. Examples of the diisocyanate include phenylene diisocyanate, diphenylmethane diisocyanate, octadecane diisocyanate, decane diisocyanate, and hexane diisocyanate. Examples of the monoamine include octylamine, dodecylamine, hexadecylamine, stearyl amine, oleylamine, aniline, p-toluidine, and cyclohexylamine.

A diurea compound represented by the following formula is desirably used in the present application.

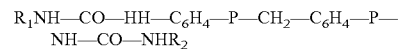

(In the formula, $R_1$ and $R_2$ each represent an aliphatic hydrocarbon group having 8 to 20 carbon atoms. $R_1$ and $R_2$ may be identical to or different from each other.)

The polyurea compound is obtained by, for example, a reaction between a diisocyanate, and a monoamine and a diamine. Examples of the diisocyanate and the monoamine include the same examples as those used for generating the diurea compound. Examples of the diamine include ethylenediamine, prop anediamine, butanediamine, hexanediamine, octanediamine, phenylenediamine, tolylenediamine, xylenediamine, and diaminodiphenylmethane.

Of the urea compounds, a diurea compound, which is excellent in heat resistance and intervention, is desired as the thickener.

EXAMPLES

Now, Examples and Comparative Examples of the present invention are described. Compositions of the grease sealed in the fixed type constant velocity universal joint according to Examples and Comparative Examples are shown in Table 1. In Table 1, compositions of the grease according to Examples and Comparative Examples are shown in the upper column for convenience. Examples and Comparative Examples are fixed type constant universal joints comprising the respective grease sealed therein. In other words, Examples and Comparative Examples are eight-ball Rzeppa fixed type constant velocity universal joints having the pocket gap δ of from 0 μm to 20 μm, and the structure thereof is described in the embodiment. As the Rzeppa fixed type constant velocity universal joint of FIG. 1 subjected to the evaluation test, EBJ82M manufactured by NTN Corporation was used.

In each of Examples and Comparative Examples, as an additive, about several mass % of molybdenum dithiocarbamate (MoDTC), molybdenum dithiophosphate (MoDTP), zinc dithiocarbamate (ZnDTC), zinc dithiophosphate (ZnDTP), or another extreme pressure additive is added in consideration of durability, while the detail thereof is omitted.

Examples and Comparative Examples have compositions shown in the left column of Table 1, respectively. In each of Examples and Comparative Examples, the numerical values in the column "Base oil" in Tables each represent, in terms of mass %, a content with respect to the total mass of the lubricating component contained as the base oil.

A paraffin-based mineral oil having a kinematic viscosity of 11 mm²/s (100° C.) and a viscosity index of 98 was used as the "paraffin-based mineral oil" in Table 1.

The results of evaluation items in Table 1 are indicated as follows.

◎: excellent, ○: practicable, Δ: slightly poor, ×: poor

[Result of Assemblability Evaluation]

A method of evaluating the assemblability is described. The intermediate shaft 12 (see FIG. 1) having the boot 13 before assembly mounted thereon was set horizontally in an automatic assembling device for a drive shaft, and a grease sealing nozzle was inserted into the boot 13 to seal the grease toward a small-diameter side of the boot 13. After that, evaluation was conducted based on presence or absence of dripping of the grease at the time of drawing out the nozzle and based on presence or absence of outflow of the grease caused by inclination of the boot 13 from the small-diameter side to a large-diameter side.

As shown in Table 1, Example 3 having the initial consistency close to a lower limit in the range of the consistency number 1 and Comparative Example 3 having the initial consistency close to an upper limit of the consistency number 2 were excellent from the viewpoint of the assemblability. Example 1, Example 2, Comparative Example 1, and Comparative Example 2 each having the initial consistency close to a median value in the range of the consistency number 1 were good from the viewpoint of the assemblability and were at a level of causing no problem in a practical sense.

[Result of Torque Loss Evaluation]

A method of evaluating torque loss is described. Under a state in which the operating angle was formed, torque was input to the fixed type constant velocity universal joint to rotate the fixed type constant velocity universal joint, and a torque difference between an input side shaft and an output side shaft was detected with use of a torque meter. The following test conditions were provided taking into account the use conditions in an actual vehicle.

(Test Conditions)

Operating Angles: 3° and 6° which are normal operating angles

Numbers of Revolutions: 200 min$^{-1}$, 400 min$^{-1}$, and 600 min$^{-1}$

Torque: 200 Nm

As shown in Table 1, it was found that Example 1, Example 2, and Example 3 exhibited low torque loss and excellent transmission efficiency, whereas Comparative Examples 1 to 3 exhibited high torque loss and poor transmission efficiency. It is assumed that Examples 1 to 3 have the mixture stability within the range of from 390 to 440, and hence the consistency increases during operation of the joint

TABLE 1

| | | Example 1 | Example 2 | Example 3 | Comparative Example 1 | Comparative Example 2 | Comparative Example 3 |
|---|---|---|---|---|---|---|---|
| Base Oil | Paraffin-based Mineral Oil | 80 | 100 | 70 | 40 | 40 | 60 |
| | Naphthene-based Mineral Oil | 20 | 0 | 30 | 60 | 60 | 40 |
| Thickener | Kind of Thickener | Aliphatic Diurea | Alicyclic Diurea + Aliphatic Diurea | Aliphatic Diurea | Alicyclic Diurea + Aromatic Diurea | Aliphatic Diurea | Lithium Soap |
| Consistency | Initial Consistency | 324 | 325 | 306 | 325 | 321 | 289 |
| | Mixture Stability | 422 | 390 | 420 | 340 | 351 | 301 |
| Evaluation Items | Assemblability | ○ | ○ | ◎ | ○ | ○ | ◎ |
| | Efficiency | ◎ | ◎ | ◎ | X | X | X |
| | Durability | ○ | ○ | ○ | ○ | ○ | Δ | to cause grease to be supplied to the gap portion, thereby being capable of reducing the torque loss. The mixture stability larger than 440 is not preferred because grease is more liable to leak out from the boot.

[Result of Durability Evaluation]

As a method of evaluating the durability, standard durability tests (high load durability test, low load durability test, and large angle oscillation durability test) of NTN Corporation were conducted.

As shown in Table 1, it was verified that Comparative Example 3 exhibited poor durability because a lithium soap was used as the thickener, whereas Examples 1 to 3 and Comparative Examples 1 and 2 exhibited sufficient durability in a practical sense because diurea was used as the thickener.

[Result of Abnormal Noise Evaluation]

Figure 6:
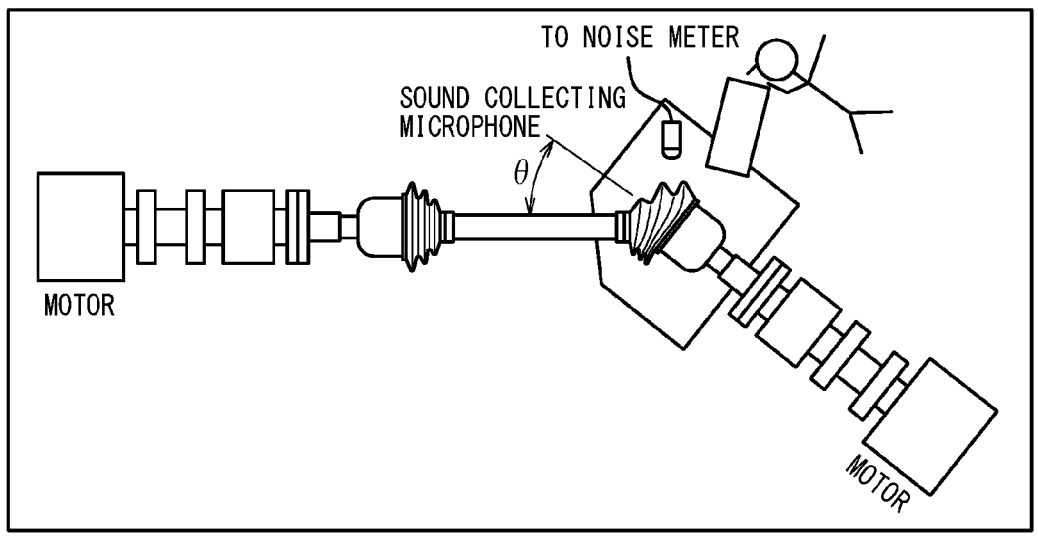
FIG. 6 is a plan view for illustrating an overview of a testing device for measuring abnormal noise.
Figure 7:
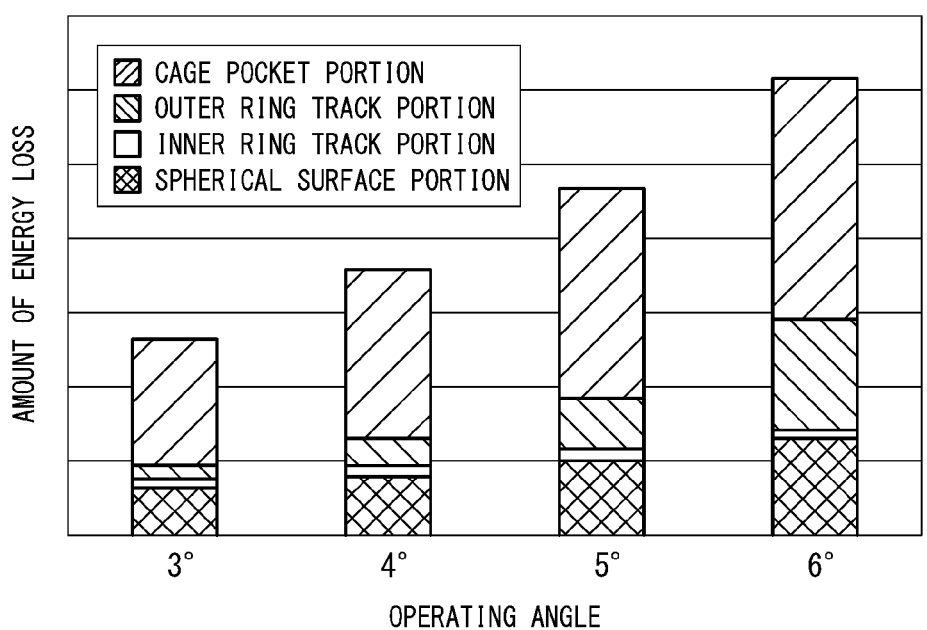
FIG. 7 is a graph for showing a result of a dynamic analysis.

Next, a test was conducted to evaluate presence or absence of occurrence of abnormal noise when the initial pocket gap δ has a positive value. The fixed type constant velocity universal joint subjected to the test was based on Example 1, and a sample was prepared with a change in the initial pocket gap δ of the cage. An overview of the testing device is illustrated in FIG. 6. While the abnormal noise tends to be larger when larger torque and a higher number of revolutions are given, the following test conditions were provided taking into account the use conditions in an actual vehicle.

(Test Conditions)
  Operating Angle: 40°
  Numbers of Revolutions: 150 min$^{-1}$, 200 min$^{-1}$, and 300 min$^{-1}$
  Torques: 147 Nm and 200 Nm The test was conducted with combinations of the torques and the numbers of revolutions provided in the above-mentioned test conditions. As illustrated in FIG. 6, abnormal noise was picked up by a sound collecting microphone and measured by a noise meter. The measurement result is shown in Table 2.

Results of the evaluation items in Table 2 are presented in the following manner.

⊚: No abnormal noise, ○: Abnormal noise was detected only within a close range (0.15 m from a sample), Δ: Abnormal noise was detected at a distance of 0.5 m, ×: Abnormal noise was detected at a distance of 1 m

TABLE 2

| Pocket Gap Amount (μm) | Results (Operating Angle 40°) |
| --- | --- |
| +10 | ⊚ |
| +20 | ○ |
| +25 | Δ |
| +30 | Δ |
| +40 | X |

With an initial pocket gap of 10 μm, abnormal noise was not detected in any combination of the torque and the number of revolutions. With an initial pocket gap of 20 μm, abnormal noise was detected only within a close range (0.15 m from the sample), but it was at a level which could not be detected in an actual vehicle, thus the demand on the sedan vehicle could be satisfied.

In contrast, with initial pocket gaps of 25 μm and 30 μm, abnormal noise was detected at a distance of 0.5 m from the sample, and with an initial pocket gap of 40 μm, abnormal noise was detected at a distance of 1 m from the sample. Thus, none of the pocket gap amounts could satisfy the demand on the sedan vehicle for which comfortability is considered with importance.

Further, the above-mentioned range of the pocket gap of from 0 μm to 20 μm, which satisfied the level of demand on the sedan vehicle in accordance with the test evaluation, also satisfied the process capability for working of the pocket. With this, the present invention which is industrially applicable has been accomplished.

The present invention is not limited to the above-mentioned embodiment. As a matter of course, the present invention may be carried out in various modes without departing from the spirit of the present invention. The scope of the present invention is defined in claims, and encompasses equivalents described in claims and all changes within the scope of claims.

DESCRIPTION OF REFERENCE SIGNS 1 fixed type constant velocity universal joint
2 outer joint member
3 inner joint member
4 torque transmission ball
5 cage
5a pocket
6 track groove
7 track groove
8 spherical radially inner surface
9 spherical radially outer surface
10 spherical radially outer surface
11 spherical radially inner surface
12 intermediate shaft
13 boot
A curvature center
B curvature center
$D_{BALL}$ ball diameter
$D_{OUTER}$ outer diameter of outer joint member
G grease
H axial size of pocket
O joint center
O5 ball center
$PCD_{SERR}$ pitch circle diameter of female spline
f1 offset amount

The invention claimed is:

1. A fixed type constant velocity universal joint, comprising:
   an outer joint member having eight curved track grooves formed in a spherical radially inner surface so as to extend in an axial direction;
   an inner joint member having eight curved track grooves formed in a spherical radially outer surface so as to extend in the axial direction;
   eight torque transmission balls arranged between the eight curved track grooves of the outer joint member and the eight curved track grooves of the inner joint member corresponding thereto; and
   a cage configured to hold the eight torque transmission balls in pockets, the cage having a spherical radially outer surface and a spherical radially inner surface to be fitted to the spherical radially inner surface of the outer joint member and the spherical radially outer surface of the inner joint member, respectively,
   wherein a curvature center of each of the eight curved track grooves of the outer joint member and a curvature center of each of the eight curved track grooves of the inner joint member are offset from a joint center by an equal distance to opposite sides in the axial direction, wherein the fixed type constant velocity universal joint has grease sealed therein, wherein initial pocket gaps between the pockets and the eight torque transmission balls each have a value that is greater than zero and an upper limit of 20 μm, and wherein the grease has an initial consistency equivalent to consistency number 1 or 2, and a mixture stability of from 390 to 440.

2. The fixed type constant velocity universal joint according to claim 1, wherein a ratio $r1(=PCD_{BALL}/D_{BALL})$ of a pitch circle diameter ($PCD_{BALL}$) and a ball diameter ($D_{BALL}$) of each of the eight torque transmission balls is within a range of $3.3 \leq r1 \leq 5.0$, and wherein a ratio $r2(=D_{OUTER}/PCD_{SERR})$ between an outer diameter ($D_{OUTER}$) of the outer joint member and a pitch circle diameter ($PCD_{SERR}$) of serrations of a fitting portion in the inner joint member is within a range of $2.5 \leq r2 < 3.5$.

3. The fixed type constant velocity universal joint according to claim 1, wherein the grease contains a paraffin-based mineral oil at 70 mass % or more with respect to a total mass of a lubricating oil component contained as a base oil.

4. The fixed type constant velocity universal joint according to claim 3, wherein a thickener for the grease comprises a urea compound.

5. The fixed type constant velocity universal joint according to claim 1, wherein a thickener for the grease comprises a urea compound.

* * * * *